(12) United States Patent
Sukonik et al.

(10) Patent No.: US 9,088,507 B1
(45) Date of Patent: Jul. 21, 2015

(54) DUMMY QUEUES AND VIRTUAL QUEUES IN A NETWORK DEVICE

(71) Applicant: Marvell Israel (M.I.S.L) Ltd., Yokneam (IL)

(72) Inventors: Vitaly Sukonik, Katzir (IL); Mark Dunaevsky, Kfar Saba (IL); Rafi Tamir, Petach-Tikva (IL); Emil Marinov, Hod Hasharon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 25 days.

(21) Appl. No.: 13/847,316

(22) Filed: Mar. 19, 2013

Related U.S. Application Data

(60) Provisional application No. 61/612,841, filed on Mar. 19, 2012.

(51) Int. Cl.
*H04L 12/54* (2013.01)
*H04L 12/815* (2013.01)

(52) U.S. Cl.
CPC ..................................... *H04L 47/22* (2013.01)

(58) Field of Classification Search
USPC ........................... 370/235, 412, 429; 709/232
See application file for complete search history.

(56) References Cited

U.S. PATENT DOCUMENTS

| | | | |
|---|---|---|---|
| 7,911,957 B2 * | 3/2011 | Kim ............................... | 370/235 |
| 8,275,916 B2 * | 9/2012 | Kim ............................... | 710/40 |
| 2003/0033421 A1 * | 2/2003 | Haeri et al. .................... | 709/232 |
| 2012/0144063 A1 * | 6/2012 | Menchaca et al. ............ | 709/240 |

OTHER PUBLICATIONS

Courcoubetis, et al., "Buffer Overflow Asymptotics for a Buffer Handling Many Traffic Sources," *J. Appl. Prob.*, Applied Probability Trust, vol. 33, pp. 886-903 (1996).

Courcoubetis, et al., "Estimation of Overflow Probabilities for State-Dependent Service of Traffic Streams with Dedicated Buffers," *RSS Research Workshop in Stochastic Networks*, Edinburgh, 8 pages (Aug. 1995).

Gibbens, et al., "On packet marking at priority queues," DRAFT, *IEEE Trans. on Automatic Control*, vol. 47, No. 6, pp. 100-105 (Jun. 2002).

Kunniyur, et al., "An Adaptive Virtual Queue (AQV) Algorithm for Active Queue Management," *IEEE/ACM Transactions on Networking*, vol. 12, No. 2, pp. 1-14 (Apr. 2004).

* cited by examiner

*Primary Examiner* — Phuc Tran

(57) ABSTRACT

In a method of processing packets in a network, a packet is received at an ingress port of a network device. A traffic class associated with the packet is determined. Based on the traffic class, it is determined whether the packet should transmitted without being enqueued by a traffic manager of the network device. When it is determined that that the packet should be transmitted without being enqueued by the traffic manager, the packet is sent to an egress port of the network device without enqueuing the packet by the traffic manager. When it is determined that the packet should not be transmitted without being enqueued in the network device, the packet is enqueued in a queue in the traffic manager of the network device. The packet sent to the egress port without being enqueued by the traffic manager is accounted for in the traffic manager.

18 Claims, 6 Drawing Sheets

DUMMY QUEUES AND VIRTUAL QUEUES IN A NETWORK DEVICE

CROSS-REFERENCES TO RELATED APPLICATIONS

The present application claims the benefit of U.S. Provisional Application No. 61/612,841 entitled "Dummy Queues & Virtual Queues for Traffic Manager," which was filed on Mar. 19, 2012, the entire disclosure of which is hereby incorporated by reference herein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network devices such as network switches, routers, edge devices and the like often employ store and forward architectures in which received packets are queued in memory in the network device for subsequent transmission from the network device. Such network devices typically perform traffic "shaping" by storing packets corresponding to different subscribers in separate queues, and independently controlling transmission of packets stored in each of the queues. With growing numbers of subscribers and growing numbers of services offered to the subscribers, such network devices need to support, for example, increasing numbers of queues.

SUMMARY

In an embodiment, a method of processing packets in a network includes receiving a packet at an ingress port of a network device and determining, with the network device, a traffic class associated with the packet. The method also includes determining, with the network device and based on the traffic class, whether the packet should transmitted without being enqueued by a traffic manager of the network device. The method further includes, when it is determined that that the packet should be transmitted without being enqueued by the traffic manager, sending the packet to an egress port of the network device without enqueuing the packet by the traffic manager; and when it is determined that the packet should not be transmitted without being enqueued in the network device, enqueuing the packet in a queue in the traffic manager. The method additionally includes accounting, in the traffic manager, for the packet sent to the egress port without being enqueued by the traffic manager.

In another embodiment, an apparatus for processing network packets comprises an ingress processing unit configured to receive a packet at an ingress port of a network device and determine a traffic class associated with the packet. The apparatus also comprises a traffic manager configured to determine, based on the traffic class, whether the packet should transmitted without being enqueued in the traffic manager. The traffic manager is further configured to, when it is determined that that the packet should be transmitted without being enqueued in the traffic manager, send the packet to an egress port of the network device, and when it is determined that the packet should not be transmitted without being enqueued in the traffic manager, enqueue the packet in a queue in the network device. The traffic manager is additionally configured to account for the packet sent to the egress port without being enqueued in the traffic manager.

In yet another embodiment, a method of processing packets in a network comprises receiving a packet at an ingress port of a network device and determining, with the network device, a traffic class associated with the packet. The method also comprises determining, with the network device and based on the traffic class, whether the packet should be enqueued (i) in a first queue, the first queue associated with only one subscriber or (ii) in a second queue, the second queue associated with a plurality of subscribers. The method additionally comprises, when it is determined that that the packet should be enqueued in the first queue, storing the packet in the first queue, and when it is determined that that the packet should be enqueued in the first queue, storing the packet in the second queue.

In still another embodiment, an apparatus for processing packets in a network comprises an ingress processing unit configured to determine a traffic class associated with a packet received via an ingress port of a network device. The apparatus also comprises a traffic manager coupled to the egress processing unit. The traffic manager is configured to determine, based on the traffic class assigned to the packet, whether the packet should be enqueued (i) in a first queue, the first queue associated with only one subscriber or (ii) in a second queue, the second queue associated with a plurality of subscribers. The traffic manager is also configured to, when it is determined that that the packet should be enqueued in the first queue, store the packet in the first queue; and when it is determined that that the packet should be enqueued in the first queue, store the packet in the second queue.

To be completed when the claims are finalized.

DETAILED DESCRIPTION

Figure 1:
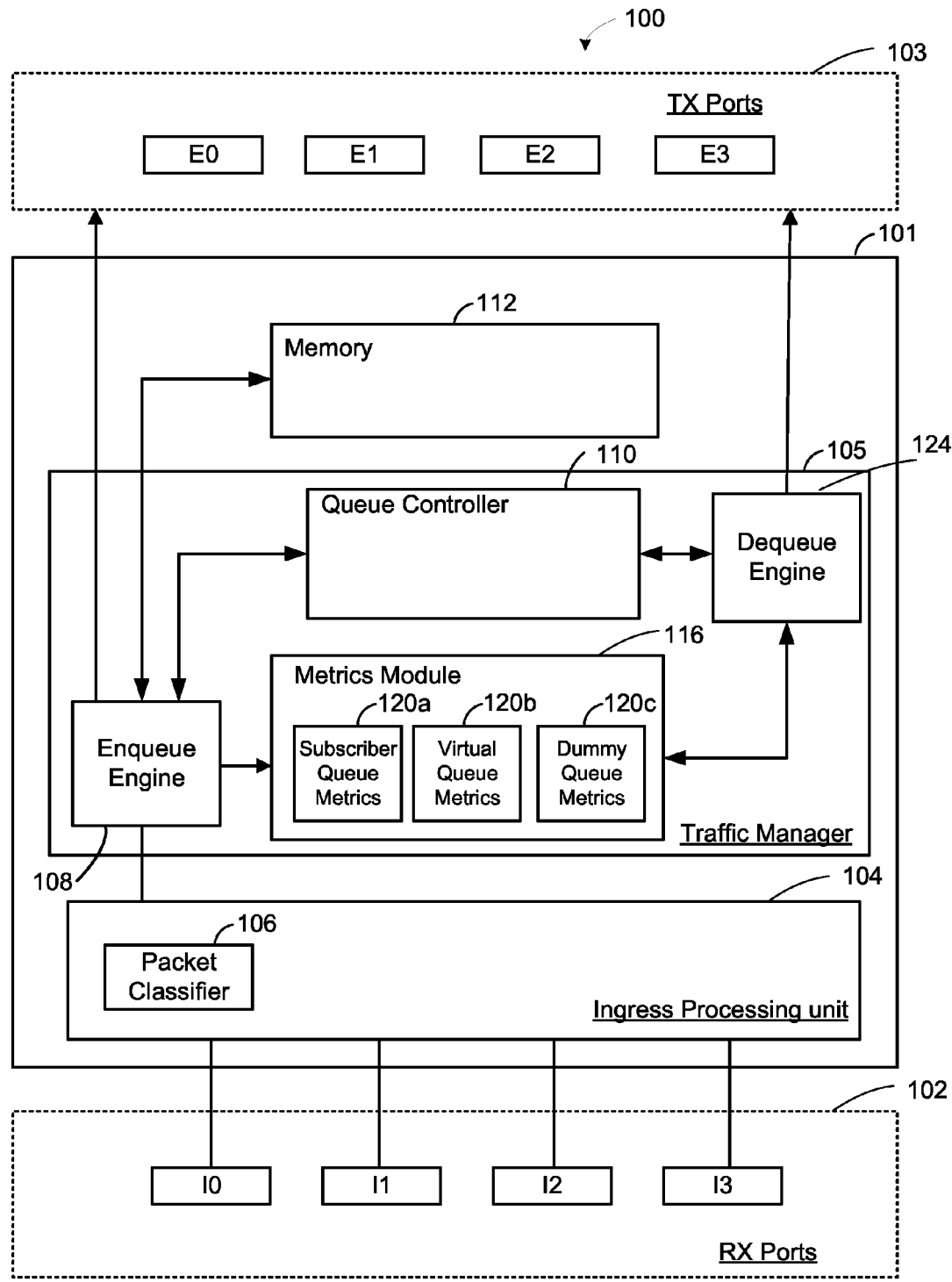
FIG. 1 is a block diagram of an example network device configured to efficiently manage traffic that traverses the network device, according to an embodiment.

FIG. 1 is a block diagram of an example network device 100 configured to efficiently manage traffic that traverses the network device 100, according to an embodiment. In various embodiments, the network device 100 is a switch, a router, or other network device configured for forwarding, switching or routing packets. The network device 100 typically is connected into a network and processes packets for forwarding, switching or routing to other network devices. Accordingly, the network device 100 is referred to interchangeably herein as a "network device," a "switch," a "router," or a "network switch." The network device 100 is configured to support a plurality of subscribers and to manage traffic egressing the network device 100, such that the overall bandwidth is efficiently shared by the plurality of subscribers, while efficiently utilizing resources of the network device 100, according to an embodiment. To these ends, the network device 100 is configured to maintain a plurality of subscriber egress queues for traffic that is shaped (e.g., intentionally delayed) at egress from the network device 100 (e.g., web browsing traffic) and one or more virtual queues and/or dummy queues for traffic intended for immediate or non-shaped transmission from the network device 100 (e.g., video on demand traffic, voice over internet protocol (VoIP) traffic, control traffic, gaming traffic), in various embodiments.

The network device 100 includes a packet processor 101 coupled to a plurality of ingress ports (also referred to herein as a receive (RX) ports) 102 and a plurality of egress ports (also referred to herein as a transmit (TX) ports) 103. In general, the packet processor 101 is configured to process packets received via ingress ports 102, to determine respective egress ports 103 via which the packets should be transmitted, and to transmit the packets via the determined egress ports 103. In at least some embodiments, the packet processor 101 is configured receive a packet at an egress port 102, to store the packet in a memory, to perform processing of the packet while the packet is stored in the memory, to determine one or more egress ports 103 via which the packet should be transmitted, and, after making the forwarding decision, to retrieve the packet from the memory and transmit the packet via the one or more egress ports 103. The packet processor 101 includes an ingress processing unit 104 that generally performs initial processing of packets that ingress via the ingress ports 102. In some embodiments, the ingress processing unit 104 generates a packet descriptor for the packet, and the packet descriptor, rather than the packet itself, is subsequently processed by the packet processor 102. A packet descriptor includes some information from the packet, such as some or all of the header information of the packet, in an embodiment. In some embodiments, the packet descriptor includes other information as well such as an indicator of where the packet is stored in a memory associated with the network device 100. For ease of explanation, the term "packet" hereinafter is used to refer to a packet itself or to a packet descriptor associated with the packet.

The ingress processing unit 104 includes a packet classifier 106 that classifies each received packet based on one or more parameters associated with or determined for the packet, and assigns a particular traffic class and/or a particular data flow to the packet, in an embodiment. Different data flows or different traffic classes are associated with different types of packets, for example, in an embodiment. For example, different data flows are defined for different subscribers and/or for different services (e.g., different applications) utilized by the subscribers, in some embodiments. The data flows are then independently managed in the network device 100, for example to ensure that services (e.g., real time services, bandwidth provisioned services, QoS services, etc.) provided to subscribers conform to service level agreement (SLA) between service providers and their customers and to generally efficiently utilize the overall bandwidth of the network device 100, in an embodiment. For example, different data flow are assigned different priority levels based on, for example, the services to which the data flow correspond, the data flows are independently managed to allow higher priority traffic to be transmitted quicker relative to lower priority traffic, while delaying lower priority traffic, in an embodiment.

In some embodiments, priority information is used to implement quality of service during egress processing (e.g., egress traffic management) in the network device 100. In an embodiment, a different priority is assigned to a packet or to a flow of which the packet is a part to differentiate between applications, delay sensitivity, and/or quality of service offerings, for example. For example, a network operator may guarantee to provide a customer with a specified amount of bandwidth for the customer's applications and may further agree to supply a certain quality of service based upon the type of traffic. To support differentiated services, packet processor 101 maintains one or more attributes such as a priority, a traffic class, etc. for each data packet. These values are set when the packet is received and are sometimes altered as the packet passes through the various processing stages, in an embodiment. In some embodiments, traffic class, priority, and/or various other packet attributes are included as part of a QoS (Quality of Service) profile that is assigned to the packet by various modules (not shown) of ingress processing unit 104. Packet processor 101 maintains attributes for each packet received at an ingress port (RX) 102 (e.g., I0, I1, I2, I3) and uses this information for managing egress of traffic from the memory device 100 during egress processing of the packet, such as to schedule transmission of the packet at an egress port (TX) 103 (e.g., E0, E1, E2, E3). Although four ingress ports and four egress ports are illustrated in FIG. 1, the packet processor 101 includes different numbers of ingress ports 102 (e.g., 1, 2, 3, 5, 6, etc.), different numbers of egress ports 103 (e.g., 1, 2, 3, 5, 6, etc.), and the number of ingress ports 102 is different than the number of egress ports 103, in other embodiments. Additionally, one or more ports each serve as both an ingress port and an egress port, in some embodiments. It is noted that in light of the teachings and disclosure herein, the configuration shown is for purposes of illustration only, and that many alternative configurations are possible and within the scope the present disclosure.

In an embodiment, the packet processor 101 includes a traffic manager 105 coupled to the ingress processing unit 104 and configured to manage transmission of packets received by the network device 100. The traffic manger 105 includes or is coupled to a memory 112 generally used by the traffic manager 105 to queue at least some packets received by the traffic manager 105 for subsequent transmission from the network device 100. In some embodiments, the traffic manager 105 enqueues some packets in a queue in the memory 112, while sending some other packets, such as real-time or delay sensitive packets for transmission via appropriate egress ports 103 without enqueuing the packets in the memory 112, as will be explained in more detail below. For example, packets belonging to real time data flows (e.g., video on demand, gaming, control traffic, etc.) are transmitted without being enqueued in the traffic manager 105, and thus are transmitted without being delayed in the traffic manager 105, in an embodiment. If the egress port to which a packet is sent is not ready to transmit the packet, the packet is dropped, according to an embodiment.

In some embodiments, the traffic manager 105 is configured to account for each packet that is transmitted without being enqueued by the traffic manager 105, for example by updating a metric (e.g., a counter) corresponding to a data flow, such as a data flow characterized by the subscriber and/or the packet typed corresponding to the packet not enqueued by the traffic manager 105, or by storing certain information about the packet (e.g., data flow associated with the packet, packet type of the packet, packet length, etc.) in a memory such that this information is available later account for the packet. In one such embodiment, such information is enqueued in a "dummy queue" in the memory 112 even though the packet itself (or a packet descriptor associated with the packet) is not enqueued in the memory 112. In another embodiment, such packet information is not enqueued in the memory 112, but is stored in another memory (not shown) included in or coupled to the traffic manager 105. In any event, the stored or enqueued information is then available to the traffic manager 105 to be utilized in performing various traffic management functions, such as scheduling functions, QoS functions, traffic shaping functions, management of egress resources functions, etc., in various embodiments.

For example, accounting for packets not actually enqueued by the traffic manager 105 allows the traffic manager 105 to utilize such accounting information for scheduling transmission of packets that are enqueued in queues in the traffic manager 105, to ensure that traffic conforms to certain QoS performance provided to subscribers supported by the network device 100, to efficiently allocate system resources among different egress ports of the network device 100, etc., in various embodiments and/or scenarios. In such embodiments, transmitting certain packets (e.g., real-time packets) without physically enqueuing the packets in the traffic manager 105, while maintaining accounting information for such packets in the traffic manager 105, reduces certain delays (e.g., enqueuing and dequeuing delays) typically associated with queuing of packets, and allows such packets to egress the network device 100 more quickly, while facilitating various traffic management functions (e.g., scheduling, QoS control, etc.) for which such accounting information is needed or desired. Further, because some packets are not enqueued by the traffic manager 105, the number of queues that need to be maintained in the traffic manager 105 is generally reduced compared to systems in which all packets are placed in queues prior to being transmitted from a network device, in at least some situations. Further still, because packets that are not enqueued in the memory 112 need not be written to or retrieved from the memory 112, memory bandwidth utilization of the memory 112 is also improved with respect to systems in which all packets need to be written to and retrieved from a queue memory, in at least some embodiments.

In addition to or instead of sending certain packets for transmission without enqueuing the packets, in the in some embodiments, the traffic manager 105 is configured to enqueue certain packets that correspond to different data flows (e.g., for different subscribers) are in a single "virtual" queue in the memory 112. For example, rather than maintaining a separate queue for each one of a plurality of data flows, the traffic manager 105 maintains a single virtual queue for packets having certain attributes (e.g., for packets associated with certain packet types) but belonging to different data flows, (e.g, data flows associated with different subscribers) and enqueues such packets belonging to the different data flows in the single virtual queue, in an embodiment. According to an embodiment, different data flows associated with packets stored in the single virtual queue are not independently managed by the traffic manager 105. For example, different data flows are not each independently scheduled for transmission by the traffic manager 105, but are rather scheduled for transmission collectively as a single flow corresponding to the virtual queue. However, in at least some such embodiments, the traffic manager 105 is configured to account for packets stored in the virtual queue independently for each of the data flows associated with packets stored in the virtual queue, for example by updating a metric (e.g., a counter) corresponding to a data flow, each time a packet associated with the data flow is enqueued in or is dequeued from the virtual queue. Such "per data flow" metrics information is utilized by the traffic manager 105 in implementing various traffic management functions, such as scheduling, QoS control, etc., for which such accounting information is needed or desired. Further, because packets belonging to multiple data flows are stored in a single virtual queue, the number of queues that need to be maintained in the traffic manager 105 is generally reduced compared to systems in which a separate queue is maintained for each of the data flows, in at least some situations.

Figure 2:
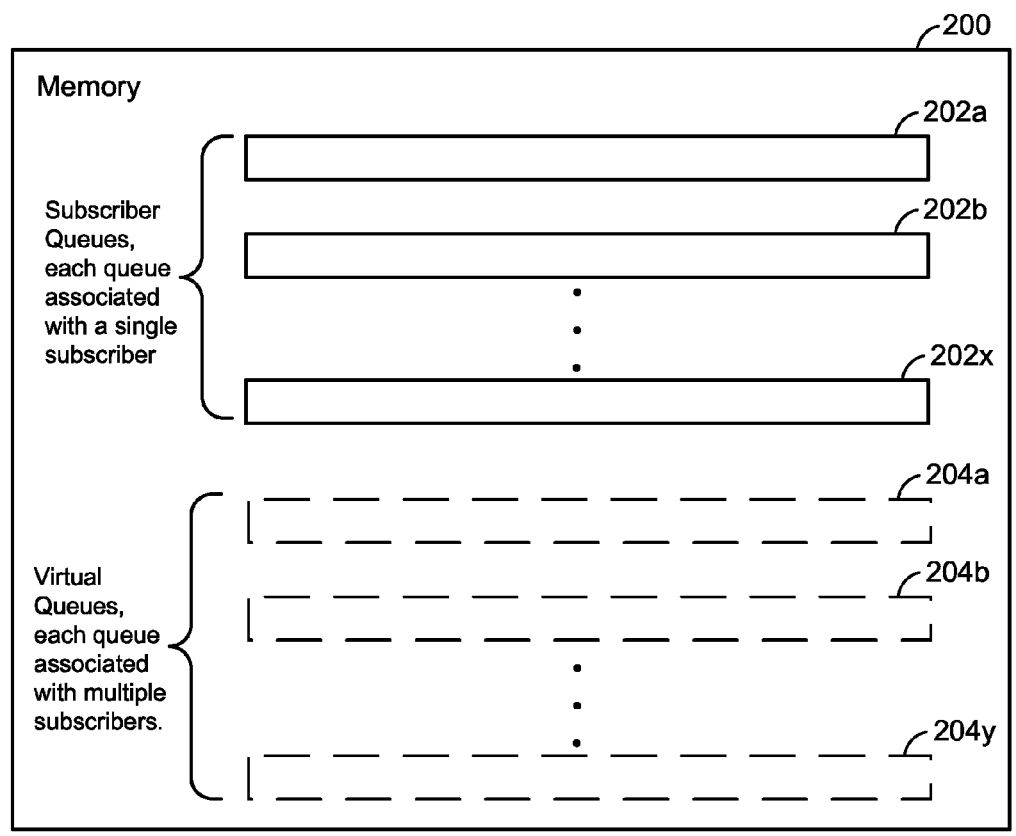
FIG. 2 is a block diagram of an example memory having a plurality of queues, according to an embodiment.

Referring briefly to FIG. 2, this figure is a diagram of an example memory 200 having a plurality of queues, according to an embodiment. The memory 200 is suitable for use as the memory 112 of FIG. 1 and is described below with reference to FIG. 1. However, memories structured as the memory 200 are utilized for queuing packets in other suitable network devices, in other embodiments. Similarly, the network device 100 of FIG. 1 utilizes a memory structured in another suitable manner for queuing packets in the network device 100, in other embodiments.

In an embodiment, the memory 200 includes a plurality of subscriber queues 202, with each subscriber queue 202 associated with a particular subscriber supported by the network device 100. In some embodiments, each subscriber queue 202 is associated with a particular subscriber and is further associated with a particular service or a particular traffic class associated with packets received from the subscriber. For example, in an embodiment, the memory 200 is structured as a hierarchy of queues that includes several subscriber queues associated with each of a plurality of subscribers. Each of the several queues associated with a subscriber is further associated with a different traffic class supported for the subscriber, for example, in an embodiment. In an embodiment, each subscriber queue 202 is managed individually, for example to individually shape traffic for each subscriber and/or for each traffic class defined for the subscriber.

The memory 200 also includes one or several virtual queues 204, in some embodiments. Each virtual queue 204 is associated with a plurality of subscribers, for example with a group of subscribers or with all subscribes supported by the network device 100. For example, a virtual queue 204 stores packets belonging to a certain high priority and/or a certain delay-sensitive data streams, such as e.g., video on demand traffic, VoIP traffic, control traffic, gaming traffic, etc. of multiple subscribers. Transmission of packets stored in a virtual queue 204 is generally not managed independently for each subscriber, in an embodiment. Rather, packets stored in the virtual queues 204 are generally delayed by the traffic manager 105 only when egress ports to which the packets are directed are unavailable for transmitting the packets, and only until the ports become available, in an embodiment. The subscriber queues 202 and the virtual queues 204 are formed as linked lists in the memory 200, in an example embodiment. In other embodiments, the subscriber queues 202 and/or the virtual queues 204 are formed in other suitable manners (e.g., as physically connected buffers) in the memory 200.

Referring back to FIG. 1, the traffic manager 105 includes a queue controller 110 coupled to an enqueue engine 108 and a dequeue engine 124. The queue controller 110 generally maintains information regarding different queues in the memory 112, in an embodiment. For example, the queue controller 110 stores and updates head and tail indications for each queue in the memory 112, and provides the head and tail indications to the enqueue engine 108 and to the dequeue engine 124, respectively, for enqueuing packets in and dequeuing packets from the queues in the memory 112. In operation, when a packet is to be enqueued in a queue in the memory 112, the enqueue engine 108 determines an appropriate queue for the packet, and requests the queue controller 110 to provide a memory location at the tail of the determined queue. The queue controller 110 provides an indication of (e.g., a pointer to) the memory location (e.g., a buffer) at the head of the determined queue, and updates the head indication to indicate a new memory location for placing a next packet into the queue. The enqueue engine 108 then writes the packet to the memory 112 at the memory location provided by the queue controller 110. Similarly, when packets are to be dequeued from the queues in the memory 112 (e.g., as scheduled by a scheduler), the dequeue engine 124 requests the queue controller 110 to provide memory locations currently at the heads of appropriate queues, and retrieves packets from memory locations provided by the queue controller 110. Each time the queue controller 110 provides an indication of a head location for a queue to the dequeue engine 124, the queue controller updates the head indication to indicate a new memory location now at the head of the corresponding queue.

As discussed above, some traffic that traverses the traffic manager 105 is sent for transmission without being enqueued in the traffic manager 105, in an embodiment. Because certain packets are not enqueued in the traffic manager 105, the number of queues maintained by the queue controller 110 is generally reduced compared to systems in which all packets are enqueued, in at least some situations. Similarly, enqueuing packets belonging to multiple subscribers in a same virtual queue in the memory 112 reduces the number of queues that need to be maintained by the queue controller 110 compared to systems in which packets belonging to each subscriber are queued in separate queues, in some embodiments. Further, in embodiments in which certain packets are sent for transmission without being enqueued in the traffic manager 105, because packets that are not enqueued do not need to be written to and do not need to be retrieved from the memory 112, memory bandwidths needed for the memory 112 is also reduced, in such embodiments.

In operation, the enqueue engine 108 receives a packet from the ingress processing unit 105 and determines whether the packet should be enqueued in the traffic manager 105 for subsequent transmission from the network device 100 or whether the packet should be sent for transmission without being enqueued in the traffic manager 105. In an embodiment, the enqueue engine 108 makes the determination based on the traffic assigned to the packet by the packet classifier 106, for example. For example, packets classified as real time packets, such as, for example, video on demand packets, are not enqueued in the traffic manager 108, but are sent to appropriate egress ports for transmission without being enqueued in the traffic manager 105, in an embodiment. Accordingly, if the enqueue engine 108 determines that the packet should not be enqueued in the traffic manager 105, then the enqueue engine 108 sends the packet for transmission via the appropriate egress ports 105, in an embodiment. The egress port to which the packet is sent receives the packet and immediately transmits the packet, in an embodiment. In an embodiment, when the egress port to which the packet is sent is not ready to transmit the packet (e.g., when the port is currently transmitting another packet), the packet is dropped.

On the other hand, if the enqueue engine 108 determines that the packet should be enqueued in the traffic manager 105, the enqueue engine 108 further processes the packet to determine an appropriate queue for the packet, in an embodiment. For example, when the enqueue engine 108 determines that a packet should be enqueued in the memory 112, the enqueue engine 108 determines whether the packet should be enqueued in a subscriber queue or in a virtual queue in the memory 112. In an embodiment, the enqueue engine 108 makes the determination based on the traffic class of the packet, for example. For example, traffic class (or classes) corresponding to packets that are not part of a real-time data stream, but are nonetheless delay-sensitive, are enqueued in a single virtual queue and are subsequently sent for transmission when the egress port (or ports) to which the packets are directed are available for transmission of the packets. In this case, packets enqueued in a virtual queue are temporarily delayed in the traffic manager 105 to prevent or minimize packet loss when egress ports to which the packets are directed are congested, but transmission of these packets is not generally shaped by the traffic manager 105.

The traffic manager 105 is further configured to collect various metrics for packets that traverse the network device 100, to utilize the collected data for shaping traffic egressing the network device 100, and/or to provide the collected data to network operators, in various embodiments. To enable the traffic manager 105 to collect metric data for traffic traversing the network device 100, the traffic manager 105 includes a metrics module 116 coupled to the enqueue engine 108 and/or the dequeue engine 124, in an embodiment. Generally speaking, the traffic manager 105 utilizes the metrics module 116 to collect metric data for various subscribers and for various services supported by the network device 100. In various embodiments, such metrics are utilized by service providers to monitor traffic for subscribers and/or services provided to subscriber, to ensure that services are meet agreed upon levels, to properly bill customers, etc. In some situations, such metrics are also utilized by the traffic manager 105 to shape traffic for different services and different subscribers to efficiently manage shared bandwidth of the network device 100, to ensure that traffic conforms to a certain agreed upon profile (e.g., in terms of transmission rate), etc.

With continued reference to FIG. 1, the metrics module 116 includes several sub-modules 120, in an embodiment. In particular, in the embodiment of FIG. 1, the metrics module 116 includes a subscriber queue metrics sub-module 120a, a virtual queue metrics sub-module 120b, and a dummy queue sub-module 120c. According to an embodiment, the subscriber queue sub-module 120a is used to collect data for packets stored in subscriber queues in the memory 112, the virtual queue sub-module 120b is used to collect data for packets stored in virtual queues in the memory 112, and the dummy queue sub-module 120c is used to collect data for packets that are sent to egress ports without being enqueued by the traffic manager 105. A corresponding sub-module 120 is updated by an enqueue engine 108 or by the dequeue engine 124 as packets are traverse the traffic manager 105. In an example embodiment, the subscriber queue metrics sub-module 120a includes a respective counter corresponding to each subscriber queue in the memory 112, and the dequeue engine 114 updates a corresponding counter in the sub-module 120a each time a packet is dequeued from a subscriber queue in the memory 112, in an embodiment. Alternatively, the enqueue engine 108 updates the corresponding counter each time a packet is enqueued in the memory 112, in another embodiment.

In an embodiment, the traffic manager 105 is configured to account for packets individually per subscriber and/or per service per subscriber even when packets for different subscribers are stored in a single virtual queue in the memory 112 or when packets are not enqueued in the memory 112. In an example embodiment, the virtual queue metrics module 120b includes a respective counter for each subscriber and/or for each service for each subscriber having packets stored in each virtual queue in the memory 112. Thus, in this embodiment, packets for different subscribers and/or different services for different subscribers that are stored in a single virtual queue in the memory 112 are individually accounted for in the virtual queue metrics module 120b. In an example embodiment, the enqueue engine 108 updates a respective counter for each subscriber when a packet for the subscriber is placed in a virtual queue in the memory 112. Alternatively, the dequeue engine 124 updates respective counters for different subscribers as packets are dequeued from a single virtual queue in the memory 112, in another example embodiment. Similarly, the dummy queue metrics sub-module 120c includes a respective counter for each subscriber and/or for each service for each subscriber to individually account for packets corresponding to different subscribers and/or to different services as the packets are sent for transmission without being enqueued in the memory 112. For example, the enqueue engine 108 updates a respective counter for each subscriber and/or for each service each time a packet corresponding to the subscribers and/or to the service is sent to an egress port 104 without being enqueued in the traffic manager 105, in an embodiment.

Figure 3:
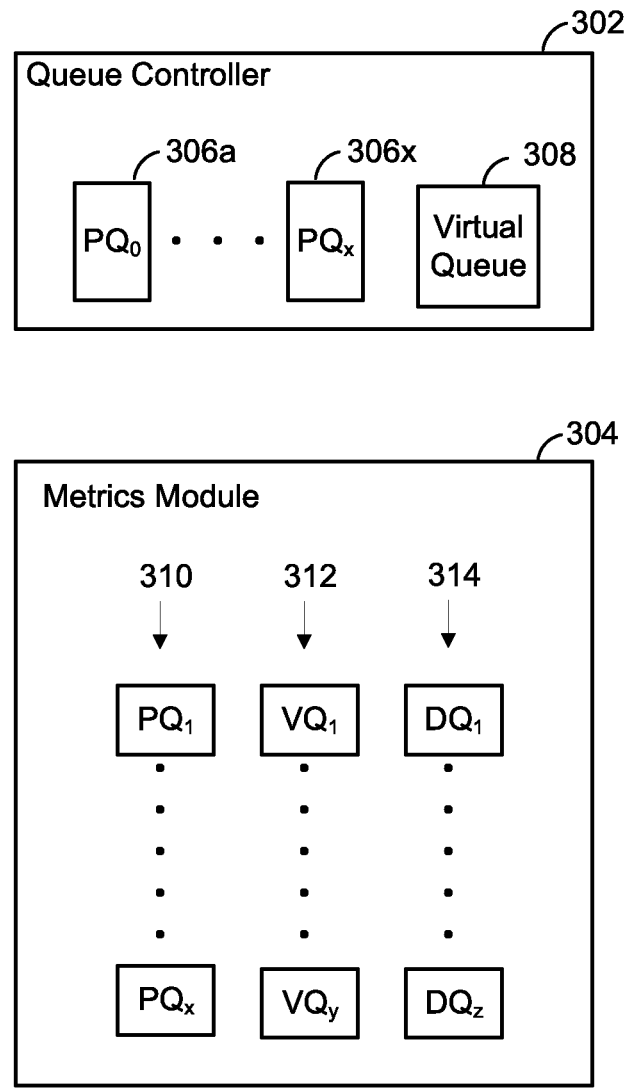
FIG. 3 is a block diagram of an example queue controller and an example metrics module, according to an embodiment.

FIG. 3 is a diagram of an example queue controller 302 and an example metrics module 304, according to an embodiment. The queue controller 302 and the metrics module 304 are suitable for use as the queue controller 110 and the metrics module 116, respectively, of FIG. 1 and are described below with reference to FIG. 1. However, the queue controller 302 and the metrics module 304 are utilized in other suitable network device, in other embodiments. Similarly, the network device 100 of FIG. 1 utilizes a suitable queue controller other than the queue controller 302 and/or a suitable metrics module other than the metrics module 304, in other embodiments.

The queue controller 302 maintains a plurality of subscriber queues 306 and a single virtual queue 308, in the illustrated embodiment. Each subscriber queue 306 corresponds to a particular subscriber and to a particular service provided to the subscriber, in an embodiment. On the other hand, the virtual queue 304 is used to store packets corresponding to different subscribers. For example, the virtual queue 304 stores packets belonging to a certain class (e.g., video on demand, VoIP, etc.) for some (e.g., a group) or all subscribers supported by the network device 100, in an embodiment. In some embodiments, the queue controller 300 maintains multiple virtual queues 308, with each virtual queue 308 storing packets corresponding to multiple subscribers (e.g., respective groups of subscribers).

The metrics module 304 includes a respective subscriber queue counter 310 corresponding to each of the subscriber queues 306. A subscriber queue counter 310 is updated each time a packet is enqueued in or dequeued from a corresponding subscriber queue 306, in an embodiment. The metrics module 304 also includes a respective virtual queue counter 312 for each subscriber associated with packets stored in the virtual queue 308, in an embodiment. A virtual counter 312 is updated each time a packet for a corresponding subscriber is enqueued in or dequeued from the single virtual queue 308, in an embodiment. Thus, the virtual counters 312 reflect per subscriber traffic even though the traffic is stored in a single virtual queue, in this embodiment. In an embodiment, the metrics module 304 includes a respective dummy queue counter 314 for each subscriber associated with packets that are not stored for subsequent transmission, in an embodiment. A dummy queue counter 312 is updated each time a packet for a corresponding subscriber traverses the traffic manager 105 but is not enqueued by the traffic manager 105, in an embodiment.

Figure 4:
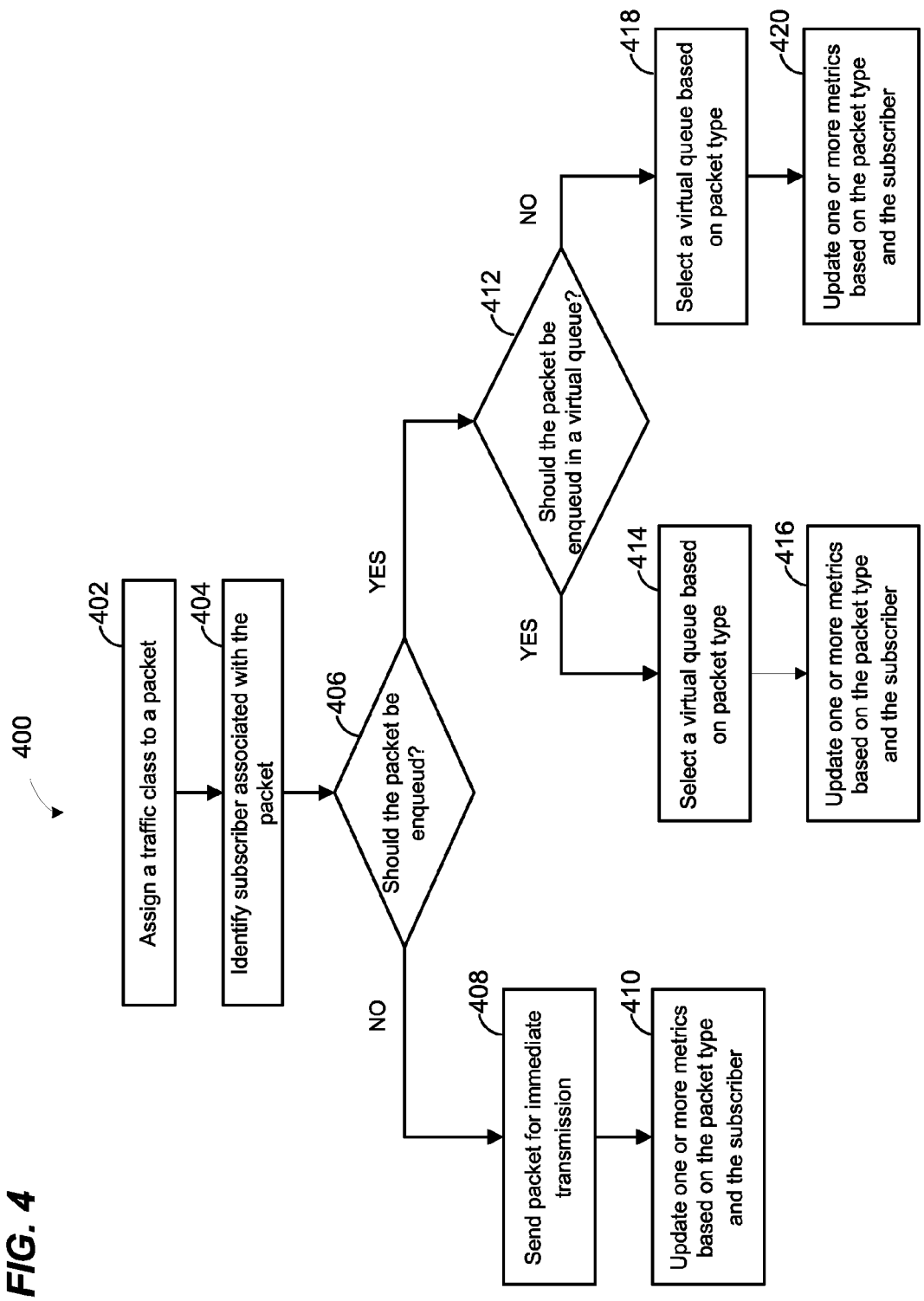
FIG. 4 is a flow diagram of an example method for enqueuing packets in a network device, according to an embodiment.

FIG. 4 is a flow diagram of an example method 400 for enqueuing packets in a network device, according to an embodiment. The method 400 is implemented by the network device 100 of FIG. 1, in an embodiment. In another embodiment, the method 400 is implemented by another suitable network device.

At block 402, a traffic class is determined for and/or assigned to a packet. The traffic class corresponds, for example, to a particular type of the packet (e.g., video on demand packet, voice over IP packet, web browsing packet, etc.), a priority level corresponding to the packet, or any other suitable attribute of packets generally processed by the network device 100, in an embodiment. At block 404, a subscriber associated with the packet is identified. Then, at block 406, it is determined whether the packet should be enqueued in a queue for subsequent transmission from the network device. If it is determined that the packet should not be enqueued, the method continues at block 408, at which the packet is sent for immediate egress from the network device. Then, at block 410, one or more metrics corresponding to the traffic class assigned at block 402 and/or the subscriber identified at block 404 is/are updated to account for the packet sent for egress at block 406.

On the other hand, when it is determined at block 406 that the packet should be enqueued for subsequent transmission from the network device, the method continues at block 412, at which it is determined whether the packet should be stored in a subscriber queue associated with a single subscriber (i.e., with the subscriber identified at block 404), or in a virtual queue associated with a plurality subscribers. For example, it is determined that the packet should be enqueued in a virtual queue when the traffic class corresponds to relatively higher delay sensitive packets, such as packets belonging to real-time traffic and/or bandwidth provisioned traffic, for example. On the other hand, it is determined that the packet should be enqueued in a subscriber queue when the traffic class corresponds to traffic that is shaped (e.g., temporarily blocked) in the network device, for example to ensure that the traffic conforms to a certain profile specified in a service level agreement.

If it is determined at block 412 that the packet should be placed in the virtual queue, then at block 414 the packet is placed in the virtual queue, wherein the virtual queue is associated with multiple data flows, such as data flows corresponding to multiple subscribers, for example. Then, at block 416, one or more metrics corresponding to the traffic class assigned at block 402 and/or the subscriber identified at block 404 is/are updated to account for the packet stored in the virtual queue at block 414. On the other hand, if it is determined at block 412 that the packet should be placed in a subscriber queue, then at block 418, a subscriber queue is selected, based on the traffic class assigned to the packet at block 402 and/or based on the subscriber identified at block 404, from a plurality of subscriber queues, wherein each subscriber queue is associated with a particular traffic class and/or a particular subscriber. Then, at block 420, one or more metrics corresponding to the selected subscriber queue is/are updated to account for the packet stored in the subscriber queue at block 418.

In some embodiments, determining whether the packet should be enqueued in the network device is omitted from the method 400. In such embodiments, blocks 406-410 are omitted from the method 400, and block 404 is connected directly to block 412. In some embodiments, determining whether the packet should be enqueued in a subscriber queue or in a virtual queue is omitted from the method 400. In such embodiments, when it is determined that the packet should be enqueued in a queue in the network device, the packet is enqueued in a subscriber queue, associated with only one subscriber (i.e., blocks 412-416 are omitted), or is enqueued in a virtual queue associated with multiple subscribers (i.e., blocks 412, 418 and 420 are omitted).

Figure 5:
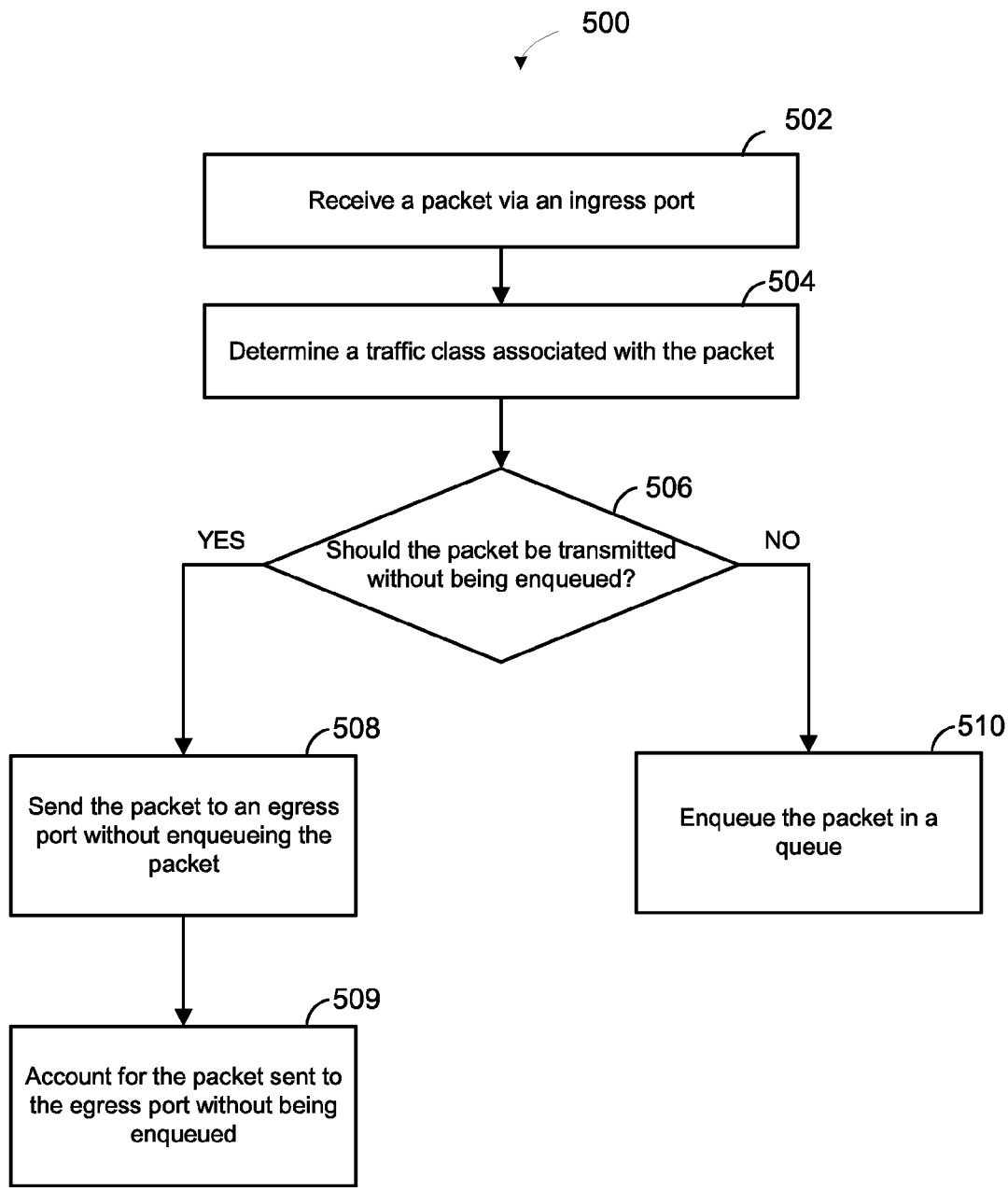
FIG. 5 is a flow diagram an example method of processing packets in a network device, according to an embodiment.

FIG. 5 is a flow diagram of an example method 500 for processing packets in a network device, according to an embodiment. For clarity, the method 500 is described below as being implemented by the packet processor 101 of FIG. 1. In other embodiments, however, one or more portions of the method 500 are implemented by another suitable packet processor or by another suitable processor such as a CPU. Furthermore, in some embodiments, one or more portions of the method 500 are implemented by more than one packet processor or suitable processor.

At block 502, the packet processor receives a packet. The packet is received at an ingress port and is initially processed by an ingress processing unit (e.g., the ingress processing unit 104 of FIG. 1), in an embodiment. At block 504, the packet processor determines a traffic class associated with the packet. An appropriate traffic class for the packet is determined based on various attributes or indicators included in or associated with the packet, in an embodiment. The traffic class corresponds, for example, to a type of a packet, a priority associated with the packet, etc., in some embodiments. At block 506, it is determined whether the packet should be transmitted from the network device without being physically enqueued in a traffic manager of the network device. The determination at block 506 is made, for example, based on the traffic class determined for the packet at block 504, in an embodiment. Accordingly, in this embodiment, packets belonging to a certain traffic class or to certain traffic classes are not enqueued in the traffic manager of the network device. For example, packets belonging to real-time data streams, such as VoIP data streams, video on demand data streams, etc. are assigned a particular traffic class, and such packets are sent for transmission without being enqueued in the traffic manager, thereby reducing the number of queues that need to be maintained by the traffic manager, and saving bandwidth of the memory used for queuing packets by the traffic manager, in at least some embodiments.

If it is determined at block 506 that the packet should be transmitted without being enqueued, then the method continues at block 508, at which the packet is sent to an egress ports of the network device without being enqueued in the network device, according to an embodiment. The method then continues at block 509, at which the packet sent for transmission without being enqueued by the traffic manager is accounted for in the traffic manager. The packet is accounted for in the traffic manager on a "per data flow" basis as discussed above, in an embodiment. For example, the packet is accounted for by updating a metric corresponding to the data flow associated with the packet, in an embodiment. In another embodiment, the packet is accounted for by storing or enqueuing, in a memory included in or coupled to the traffic manager, some information associated with the packet such that this stored information is subsequently available to account for the packet in the traffic manager. Accounting for the packet in the traffic manager while not actually enqueuing the packet in the traffic manager, allows the traffic manager to utilize the accounting information in various functions performed by the traffic manager, while not actually delaying the packet in the traffic manager, in at least some embodiments.

On the other hand, if it is determined at block 506 that the packet should not be transmitted without being enqueued (i.e., when it is determined that the packet should be enqueued), then the method continues at block 510, at which the packet is enqueued in a queue (e.g., in a subscriber queue or in a virtual queue discussed above in regard to FIG. 2), in an embodiment.

Figure 6:
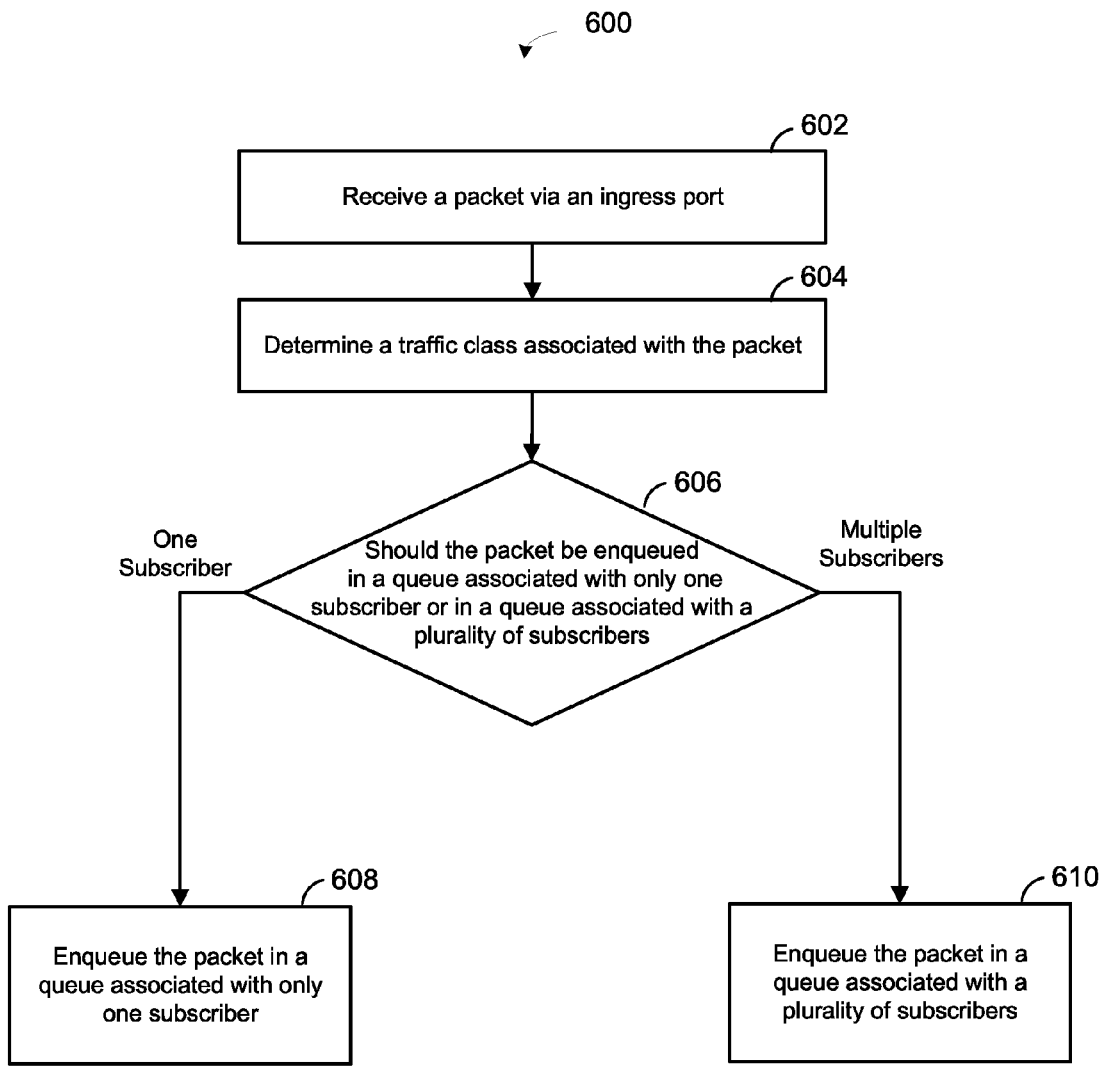
FIG. 6 is a flow diagram another example method of processing packets in a network device, according to an embodiment.

FIG. 6 is a flow diagram of an example method 600 for processing packets in a network device, according to an embodiment. For clarity, the method 600 is described below as being implemented by the packet processor 101 of FIG. 1. In other embodiments, however, one or more portions of the method 600 are implemented by another suitable packet processor or by another suitable processor such as a CPU. Furthermore, in some embodiments, one or more portions of the method 600 are implemented by more than one packet processor or suitable processor.

At block 602, the packet processor receives a packet. The packet is received at an ingress port and is initially processed by an ingress processing unit (e.g., the ingress processing unit 104 of FIG. 1), in an embodiment. At block 604, the packet processor determines a traffic class associated with the packet. An appropriate traffic class for the packet is determined based on various attributes or indicators included in or associated with the packet, in an embodiment. The traffic class corresponds, for example, to a type of a packet, a priority associated with the packet, etc., in some embodiments. At block 606, it is determined whether the packet should be enqueued in a traffic manager in a first queue, the first queue associated with a single subscriber or in a second queue, the second queue associated with a plurality of subscribers. For example it is determined whether the packet should be stored in a subscriber queue 202 or whether the packet should be stored in a virtual queue 204 (FIG. 2), in an embodiment. The determination at block 606 is made, for example, based on the traffic class determined for the packet at block 604, in an embodiment. Accordingly, in this embodiment, packets belonging to a certain traffic class or to certain traffic classes are stored in a queue associated with multiple subscribers, while packets belonging to other traffic classes are separate queues corresponding to each individual subscriber. For example, packets belonging to data streams that are not typically shaped by the network device (e.g., packets belonging to a data stream for which bandwidth is provisioned by the network provider) are enqueued in a single queue and are subsequently sent to appropriate egress ports when the egress ports are able to transmit the packets, in an embodiment. On the other hand, packets belonging to traffic that is subject to shaping in the network device are stored in dedicated queues associated with only one subscribers and/or only one traffic class, such that this traffic can be individually managed for different traffic classes and/or for different subscribers, in an embodiment.

If it is determined at block 606 that the packet should be enqueued in a queue associated with only one subscribers, then the method continues at block 608, at which the packet is enqueued in an appropriate queue (e.g., a subscriber queue 202 of FIG. 2) associated with the subscriber to which the packet belongs, according to an embodiment. For example, the packet processor selects the appropriate queue by identifying a subscriber associated with the packet, and selecting a queue associated with the identified subscriber, or selecting a queue associated with the identified subscriber and the traffic class assigned to the packet. On the other hand, if it is determined at block 606 that the packet should be enqueued in a queue associated with multiple subscribers (e.g., a virtual queue 204 of FIG. 2), then the method continues at block 610, at which the packet is enqueued in a queue associated with multiple subscribers (e.g. all subscribers supported by the network device or a subset of subscribers, such as a group of subscribers, supported by the network device), in an embodiment. Because packets associated with multiple subscribers are physically enqueued in a single queue in the traffic manager, the total number of queues that needs to be maintained in the traffic manager is reduced, in at least some embodiments.

While the principles of the disclosure have been described above in connection with specific apparatuses and methods, it is to be clearly understood that this description is made only by way of example and not as limitation on the scope of the invention. Additionally, at least some of the various blocks, operations, and techniques described above may be implemented in hardware, a processor or computer executing firmware and/or software instructions, or any combination thereof. When implemented utilizing a processor executing software or firmware instructions, the executable software or firmware instructions may be stored in any tangible, computer readable or machine readable memory such as on a magnetic disk, an optical disk, or other tangible storage medium, in a RAM or ROM or flash memory, processor, hard disk drive, optical disk drive, tape drive, etc. The software or firmware instructions may include computer readable or machine readable instructions stored on a memory of another one or more computer readable or machine readable storage medium that, when executed by the processor, cause the processor to perform various acts. When implemented in hardware, the hardware may comprise one or more of discrete components, an integrated circuit, an application-specific integrated circuit, etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method of processing packets in a network, the method comprising:
   receiving a packet at an ingress port of a network device;
   determining, with the network device, a traffic class with which the packet is associated;
   determining, with the network device and based on the traffic class, whether the packet is to be (i) enqueued by a traffic manager of the network device or (ii) transmitted without being enqueued by the traffic manager of the network device;
   maintaining, at the network device, a plurality of dummy queue metrics to account for packets not enqueued by the traffic manager, wherein each dummy queue metric is associated with one or both of (i) a particular subscriber and (ii) a particular traffic class; and
   when it is determined that that the packet is to be transmitted without being enqueued by the traffic manager,
      sending the packet to an egress port of the network device without enqueuing the packet by the traffic manager,
      updating a dummy queue metric of the plurality of dummy queue metrics, wherein the dummy queue metric corresponds to one or both of (i) a subscriber associated with the packet and (ii) the traffic class assigned to the packet; and
   when it is determined that the packet is to be enqueued by the traffic manager, enqueuing the packet in a queue in the traffic manager.

2. The method of claim 1, wherein updating the dummy queue metric comprises incrementing a counter corresponding to one or both of (i) the subscriber associated with the packet and (ii) the traffic class assigned to the packet to account for the packet not enqueued in the network device.

3. The method of claim 1, further comprising enqueuing additional packets in the traffic manager and utilizing the dummy queue metric for managing transmission of the additional packets enqueued in the traffic manager.

4. The method of claim 1, wherein enqueuing the packet in the queue in the traffic manager comprises:
   determining, based on the traffic class, whether the packet is to be enqueued (i) in a first queue, the first queue associated with only one subscriber or (ii) in a second queue, the second queue associated with a plurality of subscribers,
   when it is determined that the packet is to be enqueued in the first queue, selecting the first queue from a plurality of first queues, wherein each first queue in the plurality of first queues corresponds one or both of (i) a particular subscriber and (ii) a particular traffic class, and storing the packet in the selected first queue, and
   when it is determined that the packet is to be stored in the second queue, storing the packet in the second queue.

5. The method of claim 1, further comprising, when the packet is sent to the egress ports without being enqueued in the network device and the egress port is not ready to transmit the packet, dropping the packet.

6. An apparatus for processing network packets, the apparatus comprising:
   an ingress processing unit configured to:
      receive a packet at an ingress port of a network device, and
      determine a traffic class associated with the packet;
   a traffic manager configured to:
      determine, based on the traffic class, whether the packet is to be (i) enqueued by the traffic manager or (ii) transmitted without being enqueued by the traffic manager of the network device;
      maintain a plurality of dummy queue metrics to account for packets not enqueued by the traffic manager, wherein each dummy queue metric is associated with one or both of (i) a particular subscriber and (ii) a particular traffic class; and
      when it is determined that that the packet is to be transmitted without being enqueued by the traffic manager, send the packet to an egress port, and
         update a dummy queue metric of the plurality of dummy queue metrics, wherein the dummy queue metric corresponds to one or both of (i) a subscriber associated with the packet and (ii) the traffic class assigned to the packet; and
      when it is determined that the packet is to be enqueued by the traffic manager, enqueue the packet in a queue in the traffic manager.

7. The apparatus of claim 6, wherein the traffic manager is configured to update the dummy queue metric at least by incrementing a counter corresponding to one or both of (i) a subscriber associated with the packet and (ii) the traffic class assigned to the packet to account for the packet not enqueued in the network device.

8. The apparatus of claim 6, wherein the ingress processing unit is further configured to receive an additional packet, and wherein the traffic manager is further configured to:
   enqueue the one or more additional packets in one or more queues in the traffic manager; and
   utilize the dummy queue metric for managing transmission of the one or more additional packets enqueued by the traffic manager.

9. The apparatus of claim 6, wherein the traffic manager is further configured to, when it is determined that the packet is to be enqueued by the traffic manager:
- determine, based on the traffic class, whether the packet is to be enqueued (i) in a first queue, the first queue associated with only one subscriber or (ii) in a second queue, the second queue associated with a plurality of subscribers,
- when it is determined that the packet is to be enqueued in the first queue, select the first queue from a plurality of first queues, wherein each first queue in the plurality of first queues corresponds one or both of (i) a particular subscriber and (ii) a particular traffic class, and storing the packet in the selected first queue, and
- when it is determined that the packet is to be stored in the second queue, store the packet in the second queue.

10. The apparatus of claim 6, wherein the egress port is configured to, when the egress port is not ready to transmit the packet sent to the egress port without being enqueued by the traffic manager, drop the packet.

11. A method of processing packets in a network, the method comprising:
- receiving a packet at an ingress port of a network device;
- determining, with the network device, a traffic class associated with the packet;
- determining, with the network device and based on the traffic class, whether the packet is to be enqueued (i) in a first queue, the first queue associated with only one subscriber and used to shape traffic associated with the one subscriber or (ii) in a second queue, the second queue associated with a plurality of subscribers and used for storing packets intended for non-shaped transmission to the plurality of subscribers;
- when it is determined that that the packet is to be enqueued in the first queue, storing the packet in the first queue; and
- when it is determined that that the packet is to be enqueued in the second queue, storing the packet in the second queue.

12. The method of claim 11, wherein when it is determined that the packet is to be enqueue in the first queue, the method further comprises:
- selecting, based on one or both of (i) a subscriber associated with the packet and (ii) the traffic class assigned to the packet, the first queue from a plurality of first queues, wherein each first queue in the plurality of first queues corresponds one or both of (i) a particular subscriber and (ii) a particular traffic class, and
- storing the packet in the selected first queue.

13. The method of claim 12, further comprising:
- maintaining a plurality of first queue metrics for the plurality of first queues, wherein each first queue metric corresponds to a respective first queue; and
- updating a first queue metric corresponding to the selected first queue to account for the packet stored in the first queue.

14. The method of claim 12, further comprising:
- maintaining a plurality of second queue metrics for the second queue, wherein each second queue metric corresponds to a respective subscriber of the plurality of subscribers associated with the second queue; and
- when it is determined that the packet is to be enqueued in the second queue, the method further comprises updating a second queue metric corresponding to one or both of (i) a subscriber associated with the packet and (ii) traffic class assigned to the packet, to account for the packet stored in the virtual queue.

15. An apparatus for processing packets in a network, the apparatus comprising:
- an ingress processing unit configured to determine a traffic class associated with a packet received via an ingress port of a network device, and
- a traffic manager coupled to the egress processing unit, the traffic manager configured to:
  - determine, based on the traffic class determined for the packet, whether the packet is to be enqueued (i) in a first queue, the first queue associated with only one subscriber and used to shape traffic associated with the one subscriber or (ii) in a second queue, the second queue associated with a plurality of subscribers and used for storing packets intended for non-shaped transmission to the plurality of subscribers;
  - when it is determined that that the packet is to be enqueued in the first queue, store the packet in the first queue; and
  - when it is determined that that the packet is to be enqueued in the first queue, store the packet in the second queue.

16. The apparatus of claim 15, wherein the traffic manager is further configured to, when it is determined that the packet is to be enqueued in the first queue, select, based on one or both of (i) a subscriber associated with the packet and (ii) the traffic class assigned to the packet, the first queue from a plurality of first queues, wherein each first queue in the plurality of first queues corresponds one or both of (i) a particular subscriber and (ii) a particular traffic class.

17. The apparatus of claim 16, wherein the traffic manager is further configured to:
- maintain a plurality of first queue metrics for the plurality of first queues, wherein each first queue metric corresponds to a respective first queue; and
- update a first queue metric corresponding to the selected first queue to account for the packet stored in the first queue.

18. The apparatus of claim 17, wherein the traffic manager is further configured to:
- maintain a plurality of second queue metrics for the second queue, wherein each second queue metric corresponds to a respective subscriber of the plurality of subscribers associated with the second queue; and
- when it is determined that the packet is to be enqueued in the second queue, update a second queue metric corresponding to one or both of (i) a subscriber associated with the packet and (ii) traffic class assigned to the packet, to account for the packet stored in the virtual queue.

* * * * *